(12) United States Patent
Zhang et al.

(10) Patent No.: US 12,119,486 B2
(45) Date of Patent: Oct. 15, 2024

(54) ANODE MATERIAL AND ELECTROCHEMICAL DEVICE AND ELECTRONIC DEVICE INCLUDING THE SAME

(71) Applicant: Ningde Amperex Technology Limited, Fujian (CN)

(72) Inventors: ChengBo Zhang, Fujian (CN); Ting Yi, Fujian (CN); Hang Cui, Fujian (CN); Yuansen Xie, Fujian (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 592 days.

(21) Appl. No.: 17/362,581

(22) Filed: Jun. 29, 2021

(65) Prior Publication Data

US 2021/0328215 A1    Oct. 21, 2021

Related U.S. Application Data

(63) Continuation of application No. PCT/CN2020/096336, filed on Jun. 16, 2020.

(30) Foreign Application Priority Data

Aug. 7, 2019   (CN) .......................... 201910726312.3

(51) Int. Cl.
*H01M 4/48*   (2010.01)
*H01M 4/04*   (2006.01)
*H01M 4/583*  (2010.01)

(52) U.S. Cl.
CPC ........... *H01M 4/48* (2013.01); *H01M 4/0471* (2013.01); *H01M 4/583* (2013.01)

(58) Field of Classification Search
CPC .............. Y02E 60/10; H01M 10/0525; H01M 2004/027; H01M 4/0471; H01M 4/131;
(Continued)

(56) References Cited

U.S. PATENT DOCUMENTS

2012/0171560 A1* 7/2012 Xu ...................... H01M 4/5825
429/188
2020/0388833 A1* 12/2020 Lee ....................... H01M 4/131

FOREIGN PATENT DOCUMENTS

CN          104577086          4/2015
CN          106816594          6/2017
(Continued)

OTHER PUBLICATIONS

Machine translation CN109755500A (Year: 2019).*
(Continued)

*Primary Examiner* — Victoria H Lynch
(74) *Attorney, Agent, or Firm* — Maier & Maier, PLLC

(57) ABSTRACT

An anode material includes a lithiated silicon oxide material and a $M_ySiO_z$ layer. The lithiated silicon oxide material includes $Li_2SiO_3$, $Li_2Si_2O_5$ or a combination thereof, and the $M_ySiO_z$ layer coats the lithiated silicon oxide material; M includes Mg, Al, Zn, Ca, Ba, B or any combination thereof; and 0<y<3, and 0.5<z<6. The anode material has high first discharge coulombic efficiency, high gram capacity, and good cycle performance.

18 Claims, 7 Drawing Sheets

(58) Field of Classification Search
CPC ...... H01M 4/1391; H01M 4/366; H01M 4/48; H01M 4/485; H01M 4/583; H01M 4/62
See application file for complete search history.

(56) References Cited

FOREIGN PATENT DOCUMENTS

| | | |
|---|---|---|
| CN | 108493438 | 9/2018 |
| CN | 109755500 | 5/2019 |
| CN | 110416543 | 11/2019 |

OTHER PUBLICATIONS

Zhang, Chengbo; First Office Action for Chinese Patent Application No. 201910726312.3, filed Aug. 7, 2019, mailed Jun. 3, 2020, 14 pages.

Zhang, Chengbo; International Search Report and Written Opinion for PCT Application No. PCT/CN2020/096336, filed Jun. 16, 2020; mailed Aug. 28, 2020; 10 pages.

Zhang, Chengbo; Second Office Action for Chinese Patent Application No. 201910726312.3, filed Aug. 7, 2019, mailed Oct. 13, 2020, 6 pages.

Zhang, Chengbo; Third Office Action for Chinese Patent Application No. 201910726312.3, filed Aug. 7, 2019, mailed Feb. 3, 2021, 14 pages.

Zhang, Chengbo; Rejection Decision for Chinese Patent Application No. 201910726312.3, filed Aug. 7, 2019, mailed May 10, 2021, 5 pages.

* cited by examiner

ANODE MATERIAL AND ELECTROCHEMICAL DEVICE AND ELECTRONIC DEVICE INCLUDING THE SAME

CROSS REFERENCE TO RELATED APPLICATIONS

The present application is a continuation of PCT International Application No. PCT/CN2020/096336, filed on 16 Jun. 2020, which claims the benefit of priority from China Patent Application No. 201910726312.3, filed on 7 Aug. 2019, the disclosure of which is hereby incorporated by reference in its entirety.

BACKGROUND OF THE INVENTION

1. Technical Field

The present application relates to the field of energy storage, and particularly to an anode material and an electrochemical device and an electronic device including the same, particularly a lithium ion battery.

2. Description of the Related Art

With the increase in the consumption of electronic products, such as notebook computers, mobile phones, tablet computers, mobile power supplies and unmanned aerial vehicles, the requirements for electrochemical devices are becoming ever stricter. For example, not only are batteries required to be light, they are also required to have high capacity and a long working life. Lithium ion batteries have become dominant in the market due to their outstanding high energy density, high safety, no memory effect and long working life.

SUMMARY

Embodiments of the present application provide an anode material and a method for preparing the same, in an attempt to solve at least one of the problems existing in the related art, at least to some extent. The embodiments of the present application also provide an anode using the anode material, an electrochemical device, and an electronic device.

In one embodiment, the present application provides an anodel material, and the anode material includes:
  a lithiated silicon oxide material and a $M_ySiO_z$ layer,
  wherein the lithiated silicon oxide material includes $Li_2SiO_3$, $Li_2Si_2O_5$ or a combination thereof, and the $M_ySiO_z$ layer is coated on the lithiated silicon oxide material;
  M includes Mg, Al, Zn, Ca, Ba, B or any combination thereof; and
  $0<y<3$, $0.5<z<6$.

In another embodiment, the present application provides a method for preparing the anode material, and the method includes:
  (1) mixing a M source with a silicon oxide $SiO_x$;
  carrying out high-temperature treatment on the mixed material at 800-1300° C. for 1-5 h;
  grinding the material subjected to the high-temperature treatment; and
  (2) mixing the material obtained above with a Li source;
  carrying out high-temperature treatment at 500-800° C. for 1-5 h;
  wherein $0.5<x<2$; and
  M includes Mg, Al, Zn, Ca, Ba, B or any combination thereof.

In another embodiment, the present application provides an anode including the anode material according to an embodiment of the present application.

In another embodiment, the present application provides an electrochemical device including the anode according to an embodiment of the present application.

In another embodiment, the present application provides an electronic device including the electrochemical device according to an embodiment of the present application.

Silicon oxide anode materials are considered to be the most likely applied anode materials due to excellent cycle stability and high capacity (1500-1800 mAh/g). However, low first coulombic efficiency of the silicon oxide anode material limits its application. The current main solution to this problem is to pre-lithiate the silicon oxide material $SiO_x$ so as to reduce its irreversible capacity loss, thereby increasing its first coulombic efficiency. At present, during the preparation of the anode, water is generally used as a solvent to disperse the anode active material in consideration of environmental protection, cost, and safety. However, doping $SiO_x$ with lithium alone will cause alloying of active Si near the surface of the particles with Li and generate a LiSi alloy which is unstable in water, and an aqueous slurry has poor stability during preparation of the anode material, for example, $H_2$ or settlement is generated in the aqueous slurry.

In the present application, a $M_ySiO_z$ shell layer is first formed on the surface of $SiO_x$ particles, and then the inside of the particles is further doped with the Li element to form $Li_2SiO_3$ and $Li_2Si_2O_5$. The surface of the anode active material formed by the above method has a magnesium silicate shell layer and the surface does not have a LiSi alloy. The first coulombic efficiency is improved, while the stability of the aqueous slurry is also improved.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the existing technology so as to facilitate the description of the embodiments of the present application. Obviously, the accompanying drawings described below are only part of the embodiments of the present application. For those skilled in the art, the accompanying drawings of other embodiments can still be obtained according to the structures illustrated in the accompanying drawings without any creative effort.

DETAILED DESCRIPTION

Figure 1:
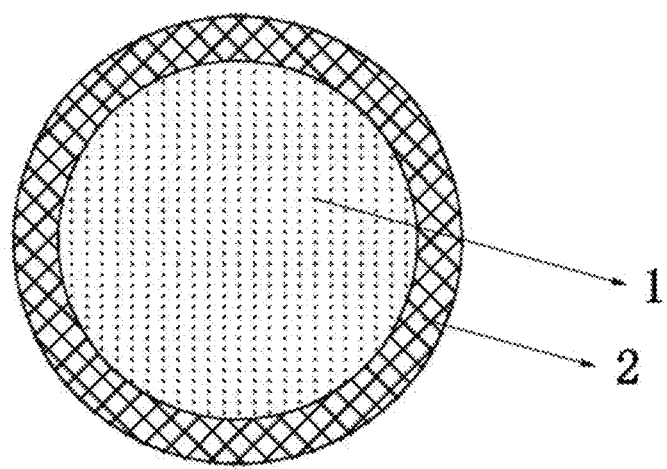
FIG. 1 shows a schematic structure diagram of the anode material of one embodiment of the present application.

Embodiments of the present application are described in detail below. The embodiments of this application should not be construed as limitations to this application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, sometimes, a quantity, a ratio, and another value are presented in a range format in the present application. It should be appreciated that such range formats are for convenience and conciseness, and should be flexibly understood according to not only values explicitly specified to range constraints, but also all individual values or sub-ranges within the ranges, like explicitly specifying each value and each sub-range.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

I. Anode Material

Embodiments of the present application provide an anode material, and the anode material includes:

a lithiated silicon oxide material and a $M_ySiO_z$ layer, wherein the lithiated silicon oxide material includes $Li_2SiO_3$, $Li_2Si_2O_5$ or a combination thereof, and the $M_ySiO_z$ layer is coated on the lithiated silicon oxide material;

M includes Mg, Al, Zn, Ca, Ba, B or any combination thereof; and $0<y<3$, $0.5<z<6$.

In some embodiments, the $M_ySiO_z$ layer includes $Mg_2SiO_4$, $Al_2SiO_5$, $Zn_2SiO_4$, $CaSiO3$, $BaSiO_3$, or any combination thereof.

In some embodiments, the thickness of the $M_ySiO_z$ layer is about 0.2 to 3 μm. In some embodiments, the thickness of the $M_ySiO_z$ layer is about 0.3 to 2.5 μm. In some embodiments, the thickness of the $M_ySiO_z$ layer is about 0.3 to 2 μm. In some embodiments, the thickness of the $M_ySiO_z$ layer is about 0.4 to 2 μm. In some embodiments, the thickness of the $M_ySiO_z$ layer is about 1 μm. In some embodiments, the thickness of the $M_ySiO_z$ layer is about 1.5 μm.

In some embodiments, the anode material further includes a carbon layer which coats at least a portion of the $M_ySiO_z$ layer.

In some embodiments, the anode material further includes a carbon layer which completely coats the $M_ySiO_z$ layer.

In some embodiments, the thickness of the carbon layer is about 1 to 500 nm. In some embodiments, the thickness of the carbon layer is about 50 to 400 nm. In some embodiments, the thickness of the carbon layer is about 100 to 300 nm. In some embodiments, the thickness of the carbon layer is about 150 to 200 nm.

In some embodiments, the weight percentage of the Li element is about 2 to 20 wt %, based on the total weight of the anode material. In some embodiments, the weight percentage of the Li element is about 2 to 15 wt %, based on the total weight of the anode material. In some embodiments, the weight percentage of the Li element is about 3 to 10 wt %, based on the total weight of the anode material. In some embodiments, the weight percentage of the Li element is about 5 to 10 wt %, based on the total weight of the anode material. In some embodiments, the weight percentage of the Li element is about 4 wt %, about 6 wt %, about 8 wt %, about 9 wt %, about 12 wt % or about 18 wt %, based on the total weight of the anode material.

In some embodiments, the weight percentage of the M element is about 2 to 30 wt %, based on the total weight of the anode material. In some embodiments, the weight percentage of the M element is about 2 to 25 wt %, based on the total weight of the anode material. In some embodiments, the weight percentage of the M element is about 2 to 20 wt %, based on the total weight of the anode material. In some embodiments, the weight percentage of the M element is about 5 to 20 wt %, based on the total weight of the anode material. In some embodiments, the weight percentage of the M element is about 5 to 15 wt %, based on the total weight of the anode material. In some embodiments, the weight percentage of the M element is about 3 wt %, about 6 wt %, about 9 wt %, about 10 wt %, about 12 wt % or about 18 wt %, based on the total weight of the anode material.

In some embodiments, the ratio of the weight percentage of the Li element to that of the Si element is about 3 to 30. In some embodiments, the ratio of the weight percentage of the Li element to that of the Si element is about 5 to 25. In some embodiments, the ratio of the weight percentage of the Li element to that of the Si element is about 8-20. In some embodiments, the ratio of the weight percentage of the Li element to that of the Si element is about 10 to 15.

In some embodiments, the ratio of the weight percentage of the M element to that of the Si element is about 5 to 60. In some embodiments, the ratio of the weight percentage of the M element to that of the Si element is about 10 to 50. In some embodiments, the ratio of the weight percentage of the M element to that of the Si element is about 15 to 55. In some embodiments, the ratio of the weight percentage of the M element to that of the Si element is about 20 to 50. In some embodiments, the ratio of the weight percentage of the M element to that of the Si element is about 25 to 40. In some embodiments, the ratio of the weight percentage of the M element to that of the Si element is about 30, about 35 or about 45.

In some embodiments, the anode material includes nanometer Si grains.

II. Preparation Method of Anode Material

Embodiments of the present application provide a method for preparing any one of the above anode materials, and the method includes:

(1) mixing a M source with a silicon oxide $SiO_x$;
carrying out high-temperature treatment on the mixed material at about 800 to 1300° C. for about 1 to 5 h;
grinding the material subjected to the high-temperature treatment to obtain a silicon oxide $SiO_x$ having a coating layer; and
(2) mixing the silicon oxide $SiO_x$ having a coating layer with a Li source;
carrying out high-temperature treatment at about 500 to 800° C. for about 1 to 5 h;
wherein $0.5<x<2$; and
M includes Mg, Al, Zn, Ca, Ba, B or any combination thereof.

In some embodiments, the M source includes a magnesium source, an aluminum source, a zinc source, a calcium source, or any combination thereof.

In some embodiments, the magnesium source includes magnesium metal, magnesium oxide, magnesium salt, or any combination thereof.

In some embodiments, the magnesium source includes nano-magnesium oxide, magnesium chloride, magnesium acetate, magnesium sulfate, magnesium hydroxide, magnesium carbonate, magnesium powder, or any combination thereof.

In some embodiments, the aluminum source includes aluminum oxide, aluminum chloride, aluminum acetate, aluminum nitrate, aluminum sulfate, aluminum isopropoxide, or any combination thereof.

In some embodiments, the zinc source includes zinc oxide, zinc chloride, zinc acetate, zinc nitrate, zinc sulfate, or any combination thereof.

In some embodiments, the calcium source includes calcium oxide, calcium chloride, calcium sulfate, calcium acetate, calcium nitrate, or any combination thereof.

In some embodiments, the lithium source includes lithium metal, lithium oxide, lithium salt, or any combination thereof.

In some embodiments, the lithium source includes lithium powder, lithium hydride, lithium oxide, lithium hydroxide, lithium carbonate, or any combination thereof.

In some embodiments, the weight ratio of the M source to the silicon oxide $SiO_x$ is about 1:10 to 5:1. In some embodiments, the weight ratio of the M source to the silicon oxide $SiO_x$ is about 1:9 to 4:1. In some embodiments, the weight ratio of the M source to the silicon oxide $SiO_x$ is about 1:9 to 3:7. In some embodiments, the weight ratio of the M source to the silicon oxide $SiO_x$ is about 1:4 to 3:7. In some embodiments, the weight ratio of the M source to the silicon oxide $SiO_x$ is about 2:3 or about 1:1.

In some embodiments, the weight ratio of the Li source to the silicon oxide $SiO_x$ having a coating layer is about 1:30 to 1:1. In some embodiments, the weight ratio of the Li source to the silicon oxide $SiO_x$ having a coating layer is about 1:20 to 1:5. In some embodiments, the weight ratio of the Li source to the silicon oxide $SiO_x$ having a coating layer is about 1:10 to 1:7. In some embodiments, the weight ratio of the Li source to the silicon oxide $SiO_x$ having a coating layer is about 1:15.

In some embodiments, the temperature of the high-temperature treatment in step (1) is about 800 to 1200° C. In some embodiments, the temperature of the high-temperature treatment in step (1) is about 900 to 1100° C. In some embodiments, the temperature of the high-temperature treatment in step (1) is about 900 to 1000° C. In some embodiments, the temperature of the high-temperature treatment in step (1) is about 850° C., 950° C., 1050° C., 1150° C. or 1250° C.

In some embodiments, the time of the high-temperature treatment in step (1) is about 1 to 4 h. In some embodiments, the time of the high-temperature treatment in step (1) is about 1 to 3 h. In some embodiments, the time of the high-temperature treatment in step (1) is about 1 to 2 h. In some embodiments, the time of the high-temperature treatment in step (1) is about 2 to 5 h. In some embodiments, the time of the high-temperature treatment in step (1) is about 2 to 4 h.

In some embodiments, the temperature of the high-temperature treatment in step (2) is about 550 to 750° C. In some embodiments, the temperature of the high-temperature treatment in step (2) is about 600 to 700° C. In some embodiments, the temperature of the high-temperature treatment in step (2) is about 620° C., 650° C. or 680° C.

In some embodiments, the time of the high-temperature treatment in step (2) is about 1 to 4 h. In some embodiments, the time of the high-temperature treatment in step (2) is about 1 to 3 h. In some embodiments, the time of the high-temperature treatment in step (2) is about 1 to 2 h. In some embodiments, the time of the high-temperature treatment in step (2) is about 2 to 5 h. In some embodiments, the time of the high-temperature treatment in step (2) is about 2 to 4 h.

In some embodiments, the mixing in steps (1) and (2) is carried out by a V-type mixer, a three-dimensional mixer, a gas stream mixer or a horizontal mixer.

In some embodiments, the high-temperature treatment in steps (1) and (2) is carried out under protection of an inert gas. In some embodiments, the inert gas includes nitrogen gas, argon gas, helium gas or a combination thereof.

In some embodiments, the drying in steps (1) and (2) is spray drying, and the drying temperature is about 100 to 300° C.

FIG. 1 shows a schematic structure diagram of the anode material of one embodiment of the present application. The inner layer 1 is a lithiated silicon oxide material, and the outer layer 2 is a magnesium silicate shell layer.

Figure 2:
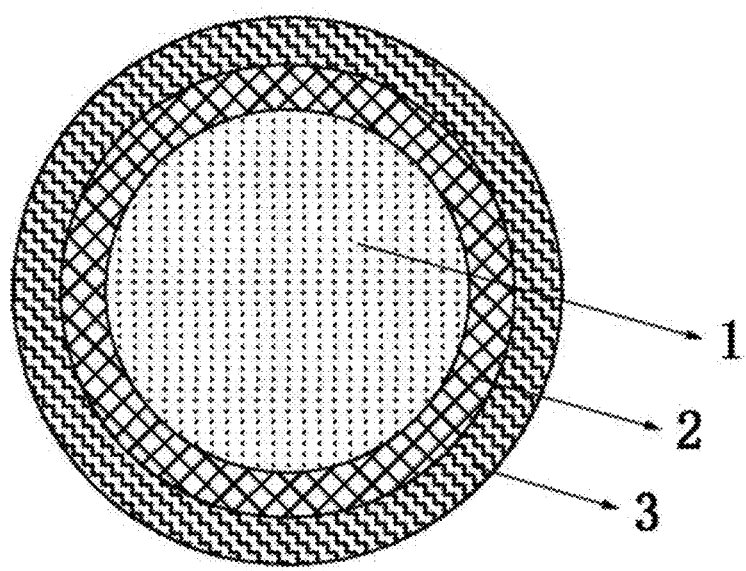
FIG. 2 shows a schematic structure diagram of the anode material of another embodiment of the present application.

FIG. 2 shows a schematic structure diagram of the anode material of another embodiment of the present application. The inner layer 1 is a lithiated silicon oxide material, the intermediate layer 2 is a magnesium silicate shell layer, and the outer layer 3 is a carbon layer.

The advantages of the anode material of the present invention will be described below by taking the Mg element as the M element as an example. Lithium-intercalated irreversible $SiO_2$ usually exists in silicon oxide $SiO_x$ particles, that is, when lithium is intercalated in these components, it cannot be deintercalated, thereby affecting the first coulombic efficiency of the anode material. When the M element is the Mg element, the Mg element and the lithium-intercalated irreversible $SiO_2$ on the surface of the silicon oxide particles form a crystalline magnesium silicate shell layer after heat treatment. Magnesium silicate has no electrochemical lithium storage capacity, such that the irreversible components to lithium in the silicon oxide $SiO_x$ are eliminated, thereby improving the first coulombic efficiency. Moreover, the magnesium silicate shell layer is in a stable phase with water, that is, magnesium silicate does not react with water, so that the formation of the magnesium silicate shell layer can solve the problem that the aqueous slurry is unstable during the preparation of the anode material. Furthermore, since the magnesium silicate has no electrochemical lithium storage capacity, the introduction of foreign elements during deintercalating and intercalating lithium does not cause volume expansion in the magnesium silicate shell layer. Therefore, the crack phenomenon on the surface of the silicon oxide $SiO_x$ caused by repeated expansion and contraction of particles is alleviated, and the side reaction of a new surface generated by the silicon oxide $SiO_x$ with the electrolytic solution is reduced, thereby improving the cycle performance of the anode material.

However, the introduction of magnesium reduces the gram capacity of the silicon oxide $SiO_x$ to some extent. In order to solve this technical problem, in the present application, the silicon oxide $SiO_x$ coated with the magnesium silicate shell layer is further doped with Li, so that the unreacted lithium-intercalated irreversible $SiO_2$ in the material reacts with Li in advance to form lithium silicate (i.e., a lithium-containing core), thereby further improving the first coulombic efficiency.

The magnesium silicate shell layer formed in advance on the surface protects the lithium-containing core, prevents the lithium-containing core from directly contacting with air or water, and improves the environmental stability of the material and the stability of the aqueous slurry during the preparation of the slurry, thereby improving the cycle performance of the material.

In some embodiments, the silicon oxide $SiO_x$ may be uncoated silicon oxide $SiO_x$ or silicon oxide $SiO_x$ at least partially coated with carbon. When the silicon oxide $SiO_x$ is a silicon oxide $SiO_x$ at least partially coated with carbon, since the silicon oxide $SiO_x$ having a carbon coating layer reacts with the M source by heat treatment in the present application, the M source can pass through the carbon coating layer by solid phase diffusion so as to chemically react with $SiO_2$ in the particles. Therefore, the $M_ySiO_z$ layer is formed on the surface of the $SiO_x$ while retaining the outermost carbon coating layer structure of the particles. For the same reason, when doping Li by heat treatment, the Li source passes through the carbon coating layer by solid phase diffusion so as to chemically react with the $SiO_2$ in the particles. Therefore, the $M_ySiO_z$ layer on the surface of the particles and the outermost carbon coating layer structure can be still retained after doping. The preparation method of the present application can improve the first coulombic efficiency of the anode active material while enhancing the conductivity of the anode material.

III. Anode

Embodiments of the present application provide an anode. The anode includes a current collector and an anode active material layer on the current collector. The anode active material layer includes an anode material according to an embodiment of the present application.

In some embodiments, the anode active material layer includes a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, or nylon.

In some embodiments, the anode active material layer includes a conductive material. In some embodiments, the conductive material includes, but is not limited to, natural graphite, artificial graphite, carbon black, acetylene black, Ketjen black, carbon fiber, metal powder, metal fiber, copper, nickel, aluminum, silver, or polyphenylene derivatives.

In some embodiments, the current collector includes, but is not limited to, copper foil, nickel foil, stainless steel foil, titanium foil, nickel foam, copper foam, or a polymer substrate coated with a conductive metal.

In some embodiments, the anode may be obtained by mixing an active material, a conductive material, and a binder in a solvent to prepare an active material composition, and coating the active material composition on a current collector.

In some embodiments, the solvent may include, but is not limited to, N-methylpyrrolidone.

IV. Cathode

Materials, compositions, and preparation methods of anodes that can be used in the embodiments of the present application include any of the techniques disclosed in the prior art. In some embodiments, the anode is an anode disclosed in U.S. Pat. No. 9,812,739B, which is incorporated into the present invention by reference in its entirety.

In some embodiments, the anode includes a current collector and an anode active material layer on the current collector.

In some embodiments, the anode active material includes, but is not limited to, lithium cobalt oxides ($LiCoO_2$), lithium nickel cobalt manganese (NCM) ternary material, lithium iron phosphate ($LiFePO_4$), or lithium manganate ($LiMn_2O_4$).

In some embodiments, the anode active material layer further includes a binder, and optionally a conductive material. The binder improves the binding of the anode active material particles to each other, and also improves the binding of the anode active material to the current collector.

In some embodiments, the binder includes, but is not limited to: polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene butadiene rubber, acrylated styrene butadiene rubber, epoxy resin, nylon or the like.

In some embodiments, the conductive material includes, but is not limited to: a carbon-based material, a metal-based material, a conductive polymer or a mixture thereof. In some embodiments, the carbon-based material is selected from natural graphite, artificial graphite, carbon black, acetylene black, Ketjen black, carbon fiber or any combination thereof. In some embodiments, the metal-based material is selected from metal powder, metal fibers, copper, nickel, aluminum or silver. In some embodiments, the conductive polymer is a polyphenylene derivative.

In some embodiments, the current collector may include, but is not limited to, aluminum.

The anode may be prepared by a preparation method known in the art. For example, the anode may be obtained by mixing an active material, a conductive material, and a binder in a solvent to prepare an active material composition, and coating the active material composition on a current collector. In some embodiments, the solvent may include, but is not limited to, N-methylpyrrolidone.

V. Electrolytic Solution

The electrolytic solution which can be used in the embodiments of the present application can be an electrolytic solution known in the prior art.

In some embodiments, the electrolytic solution includes an organic solvent, a lithium salt, and an additive. The organic solvent used in the electrolytic solution according to the present application may be any organic solvent known in the art as a solvent for an electrolytic solution. The electrolyte used in the electrolytic solution according to the present application is not limited, and may be any electrolyte known in the art. The additive of the electrolytic solution according to the present application may be any additive known in the prior art which can be used as an additive of the electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of organic lithium salt or inorganic lithium salt.

In some embodiments, the lithium salt includes, but is not limited to: lithium hexafluorophosphate ($LiPF_6$), lithium tetrafluoroborate ($LiBF_4$), lithium difluorophosphate ($LiPO_2F_2$), lithium bis(trifluoromethanesulphonyl)imide $LiN(CF_3SO_2)_2$(LiTFSI), lithium bis(fluorosulfonyl)imide $Li(N(SO_2F)_2)$(LiFSI), lithium bis(oxalato)borate LiB$(C_2O_4)_2$ (LiBOB), or lithium difluoro(oxalato)borate $LiBF_2(C_2O_4)$(LiDFOB).

In some embodiments, the concentration of the lithium salt in the electrolytic solution is about 0.5 to 3 mol/L, about 0.5 to 2 mol/L, or about 0.8 to 1.5 mol/L.

VI. Separator

In some embodiments, a separator is arranged between the anode and the anode to prevent short circuits. The material and shape of the separator which can be used in the embodiments of the present application are not particularly limited, and can be any of the techniques disclosed in the prior art. In some embodiments, the separator includes a polymer or inorganic substance or the like formed of a material that is stable in the electrolytic solution of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate, and polyimide. Specifically, a polypropylene porous film, a polyethylene porous film, polypropylene nonwoven cloth, polyethylene nonwoven cloth or a polypropylene-polyethylene-polypropylene porous composite film can be adopted.

At least one surface of the substrate layer is provided with a surface treatment layer, which may be a polymer layer or an inorganic layer, or a layer formed by mixing a polymer and an inorganic substance.

The inorganic layer includes inorganic particles and a binder, and the inorganic particles are any one or combination of more than one selected from aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is any one or combination of more than one selected from polyvinylidene fluoride, vinylidene fluoride-hexafluoropropylene copolymer, polyamide, polyacrylonitrile, polyacrylate ester, polyacrylic acid, polyacrylate salt, polyvinylpyrrolidone, polyvinyl ether, polymethyl methacrylate, polytetrafluoroethylene, and polyhexafluoropropylene.

The polymer layer includes a polymer selected from at least one of polyamide, polyacrylonitrile, acrylate polymer, polyacrylic acid, polyacrylate salt, polyvinylpyrrolidone, polyvinyl ether, polyvinylidene fluoride or poly(vinylidene fluoride-hexafluoropropylene).

VII. Electrochemical Device

Embodiments of the present application provide an electrochemical device that includes any device that undergoes an electrochemical reaction.

In some embodiments, the electrochemical device of the present application includes an anode having an anode active material capable of occluding and releasing metal ions, an anode according to embodiments of the present application, an electrolytic solution, and a separator arranged between the anode and the anode.

In some embodiments, the electrochemical devices of the present application include, but are not limited to, all types of primary batteries, secondary batteries, fuel batteries, solar batteries, or capacitors.

In some embodiments, the electrochemical device is a lithium secondary battery.

In some embodiments, the lithium secondary battery includes, but is not limited to, a lithium metal secondary battery, a lithium ion secondary battery, a lithium polymer secondary battery, or a lithium ion polymer secondary battery.

VIII. Electronic Device

The electronic device of the present application may be any device using an electrochemical device according to an embodiment of the present application.

In some embodiments, the electronic device include, but not limited to: a notebook computer, a pen-input computer, a mobile computer, an e-book player, a portable phone, a portable fax machine, a portable copier, a portable printer, head-mounted stereo headphones, a video recorder, an LCD TV, a portable cleaner, a portable CD player, a Mini disc player, a transceiver, an electronic notebook, a calculator, a memory card, a portable recorder, a radio, a backup power source, a motor, a vehicle, a motorcycle, a motorbicycle, a bicycle, a lighting apparatus, a toy, a game console, a clock, an electric tool, a flashing light, a camera, a large battery for household use, or a lithium ion capacitor.

Hereinafter, the lithium ion battery is exemplified as an example and the preparation of the lithium ion battery is described in conjunction with a specific embodiment. Those skilled in the art would understand that the preparation method described in the present application is merely an example, and any other suitable preparation methods fall within the scope of the present application.

EMBODIMENT

Embodiments of the lithium ion battery according to the present application and comparative examples for performance evaluation are described below.

1. Preparation of an Anode Material

The anode materials of Embodiments 1-7 were prepared by the following method:
 (1) mixing MgO with a commercially available silicon oxide $SiO_x$ (0.6<x<0.9, average particle diameter D50=6 μm) according to a weight ratio of 2:8;
 (2) in a tube furnace with argon gas, heat treating at 1100° C. for 2 hours, grinding, and sieving to obtain silicon oxide $SiO_x$ particles coated with $Mg_2SiO_4$ on the surface (hereinafter referred to as $SiO_x \cdot Mg_2SiO_4$);
 (3) mixing LiH with the intermediate product $SiO_x \cdot Mg_2SiO_4$ according to a weight ratio of 1:15;
 (4) in a tube furnace with argon gas, heat treating at 600° C. for 2 hours, grinding and sieving to obtain the final product (hereinafter referred to as the lithium-containing $SiO_x \cdot Mg_2SiO_4$ core-shell material).

The preparation method of the anode material in Embodiments 2-7 was similar to the preparation method of Embodiment 1, except that the ratio of MgO to silicon oxide $SiO_x$ and the ratio of LiH to the intermediate product $SiO_x \cdot Mg_2SiO_4$ are different. See Table 1 for specific ratios.

The anode material in Comparative Example 1 was the original commercially available silicon oxide $SiO_x$, that is, the silicon oxide $SiO_x$ was not subjected to a magnesium silicate coating and a Li doping.

The preparation method of the anode material in Comparative Example 2 was similar to that of Embodiment 1, except that the silicon oxide $SiO_x$ in Comparative Example 2 was not subjected to a Li doping after the magnesium silicate coating.

As to the anode material in Comparative Example 3, the silicon oxide $SiO_x$ was directly doped with Li, but not coated with magnesium silicate. The doping process was similar to that in Embodiment 1.

2. Preparation of a Lithium Ion Battery

For the anode materials prepared in Embodiments 1-7 and Comparative Examples 1-3, the conductive agent acetylene black, and the binder polyacrylic resin (PAA) according to a weight ratio of 80:10:10 were fully stirred and mixed in deionized water to prepare an anode slurry. Then, the anode slurry was uniformly coated on the front and back sides of an anode current collector copper foil, and then dried at 85° C. to form an anode active material layer. Then, cold pressing, slitting, cutting and welding an anode tab were carried out to obtain the anode.

A metal lithium film attached to the current collector copper foil was used as a counter electrode, and the metal lithium film was cut and welded with tabs in a dry room to obtain the counter electrode.

A solution prepared from a lithium salt $LiPF_6$ and a nonaqueous organic solvent (ethylene carbonate (EC):diethyl carbonate (DEC):polypropylene carbonate (PC):propyl propionate (PP):vinylene carbonate (VC)=20:30:20:28:2, weight ratio) according to a weight ratio of 8:92 was used as the electrolytic solution for the lithium-ion battery.

A ceramic coated polyethylene (PE) material separator was used as the separator.

The counter electrode, the separator and the anode were stacked in such an order that the separator was between the anode and the anode to perform the role of isolation. The electrode components were placed in a package, an electrolytic solution was injected and packaged, and then formation was carried out to obtain a final lithium ion battery.

3. Performance Test of a Lithium Ion Battery (1) Charge and Discharge Test

A lithium ion battery was discharged to 5 mV at a constant current and at a rate of 0.05 C, and then discharged at a constant voltage of 5 mV until the current dropped to 10 μA. Then the lithium ion battery was charged to 2V at a constant current and at a rate of 0.05 C to finish the charge and discharge capacity test.

(2) Cycle Performance Test

A lithium ion battery was discharged to 5 mV at a constant current and at a rate of 0.05 C, and then discharged at a constant voltage of 5 mV until the current dropped to 10 μA. Then the lithium ion battery was charged to 2V at a constant current and at a rate of 0.05 C to finish one charge and discharge cycle. The above charge and discharge cycle test was repeated to test the cycle performance of the lithium ion battery.

Table 1 lists the types and weight ratios of the raw materials of the Embodiments and Comparative Examples.

TABLE 1

| No. | MgO:$SiO_x$ (weight ratio) | LiH:$SiO_x$:$Mg_2SiO_4$ (weight ratio) |
|---|---|---|
| Embodiment 1 | 2:8 | 1:15 |
| Embodiment 2 | 2:8 | 1:20 |
| Embodiment 3 | 2:8 | 1:10 |
| Embodiment 4 | 2:8 | 1:7 |
| Embodiment 5 | 1:9 | 1:15 |
| Embodiment 6 | 3:7 | 1:15 |
| Embodiment 7 | 4:6 | 1:15 |
| Comparative Example 1 | 0 | 0 |
| Comparative Example 2 | 2:8 | 0 |
| Comparative Example 3 | 0 | 1:15 |

Table 2 lists the composition and performance test results of the anode materials of the Embodiments and Comparative Examples.

TABLE 2

| No. | Li content (wt %) | Mg content (wt %) | Li/Si content ratio (wt %) | Mg/Si content ratio (wt %) | Shell thickness (μm) | Shell material | Core material | Gram capacity (mAh/g) | First coulombic efficiency (%) |
|---|---|---|---|---|---|---|---|---|---|
| Embodiment 1 | 6.0 | 9.8 | 11.5 | 22.8 | 1 | $Mg_2SiO_4$ | $SiO_x$, $Li_2SiO_3$, $Li_2Si_2O_5$ | 1245 | 86.9 |
| Embodiment 2 | 3.0 | 9.8 | 5.4 | 22.6 | 1 | $Mg_2SiO_4$ | $SiO_x$, $Li_2SiO_3$, $Li_2Si_2O_5$ | 1283 | 84.7 |

TABLE 2-continued

| No. | Li content (wt %) | Mg content (wt %) | Li/Si content ratio (wt %) | Mg/Si content ratio (wt %) | Shell thickness (μm) | Shell material | Core material | Gram capacity (mAh/g) | First coulombic efficiency (%) |
|---|---|---|---|---|---|---|---|---|---|
| Embodiment 3 | 9.0 | 9.8 | 18.8 | 22.4 | 1 | $Mg_2SiO_4$ | $SiO_x$, $Li_2SiO_3$, $Li_2Si_2O_5$ | 1192 | 88.5 |
| Embodiment 4 | 12.0 | 9.8 | 26.7 | 22.9 | 1 | $Mg_2SiO_4$ | $SiO_x$, $Li_2SiO_3$, $Li_2Si_2O_5$ | 1151 | 91.6 |
| Embodiment 5 | 6.0 | 5.5 | 11.9 | 11.6 | 0.4 | $Mg_2SiO_4$ | $SiO_x$, $Li_2SiO_3$, $Li_2Si_2O_5$ | 1334 | 86.0 |
| Embodiment 6 | 6.0 | 12.7 | 11.1 | 30.9 | 1.4 | $Mg_2SiO_4$ | $SiO_x$, $Li_2SiO_3$, $Li_2Si_2O_5$ | 1153 | 87.2 |
| Embodiment 7 | 6.0 | 18.5 | 11.7 | 51.8 | 1.8 | $Mg_2SiO_4$ | $SiO_x$, $Li_2SiO_3$, $Li_2Si_2O_5$ | 1060 | 87.9 |
| Comparative Example 1 | 0.0 | 0.0 | 0.0 | 0.0 | — | — | $SiO_x$ | 1500 | 79.2 |
| Comparative Example 2 | 0.0 | 9.8 | 0.0 | 22.6 | 1 | $Mg_2SiO_4$ | $SiO_x$ | 1316 | 82.6 |
| Comparative Example 3 | 6.0 | 0.0 | 11.5 | 0.0 | — | — | $SiO_x$, $Li_2SiO_3$, $Li_2Si_2O_5$ | 1420 | 86.0 |

"—" means such substance not present.

Figure 3:
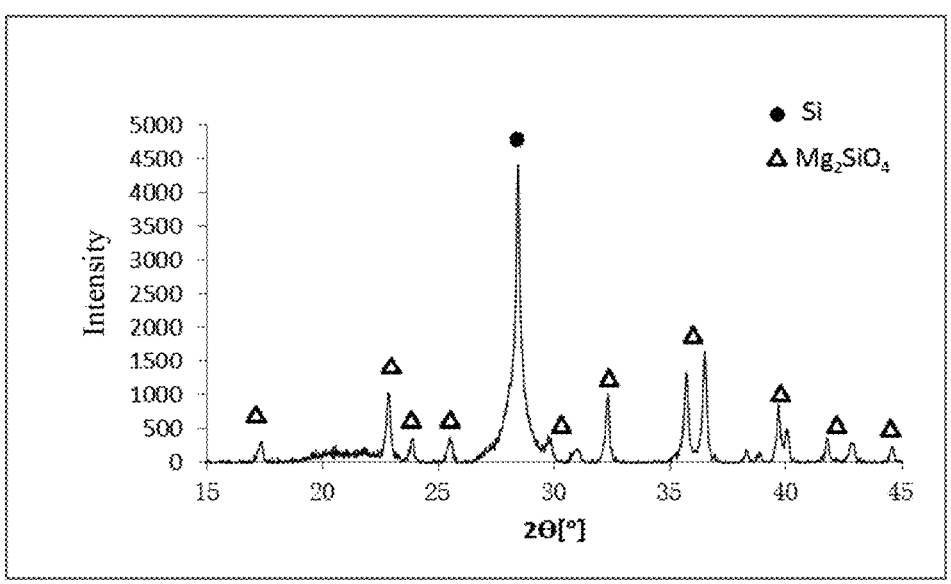
FIG. 3 is an X-ray diffraction (XRD) pattern of the intermediate product $SiO_x \cdot Mg_2SiO_4$ of Embodiment 1 of the present application.

FIG. 3 is an X-ray diffraction (XRD) pattern of the intermediate product $SiO_x \cdot Mg_2SiO_4$ of Embodiment 1 of the present application. FIG. 3 shows a plurality of characteristic peaks of $Mg_2SiO_4$, proving the existence of $Mg_2SiO_4$.

Figure 4:
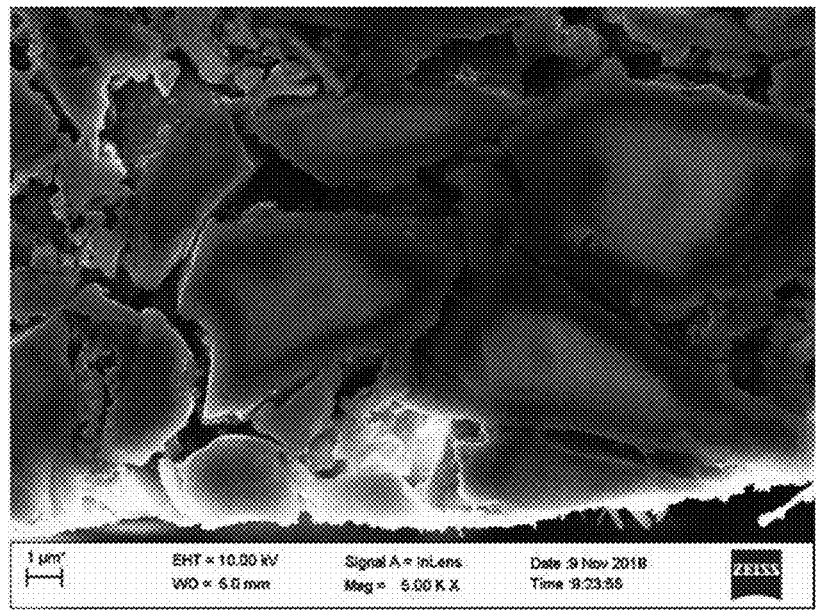
FIG. 4 is a scanning electron microscope (SEM) image of a cross-section of the intermediate product $SiO_x \cdot Mg_2SiO_4$ of Embodiment 1 of the present application.

FIG. 4 is a scanning electron microscope (SEM) image of a cross-section of the intermediate product $SiO_x \cdot Mg_2SiO_4$ of Embodiment 1 of the present application. As can be seen from the image, the surface of the $SiO_x$ particles is rich in the Mg element, and the Mg element signal is derived from $Mg_2SiO_4$.

Figure 5:
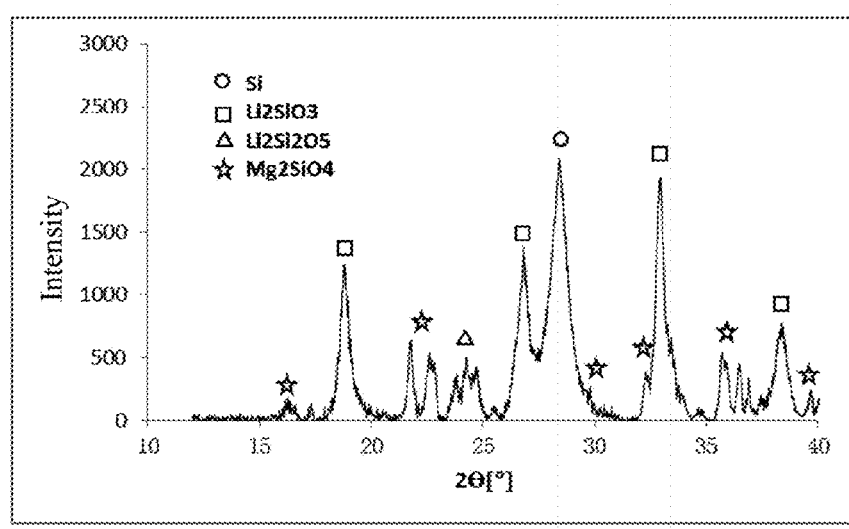
FIG. 5 is an X-ray diffraction (XRD) pattern of the sample obtained in Embodiment 1 of the present application.

FIG. 5 is an X-ray diffraction pattern of the sample obtained in Embodiment 1 of the present application. FIG. 5 shows that the sample obtained in Embodiment 1 contains lithiated silicon oxide materials $Li_2SiO_3$ and $Li_2Si_2O_5$. Further, FIG. 5 shows a plurality of characteristic peaks of $Mg_2SiO_4$, proving the existence of $Mg_2SiO_4$. Accordingly, the anode material obtained in Embodiment 1 of the present application is a $SiO_x \cdot Mg_2SiO_4$ core-shell material containing lithium silicate.

Figure 6:
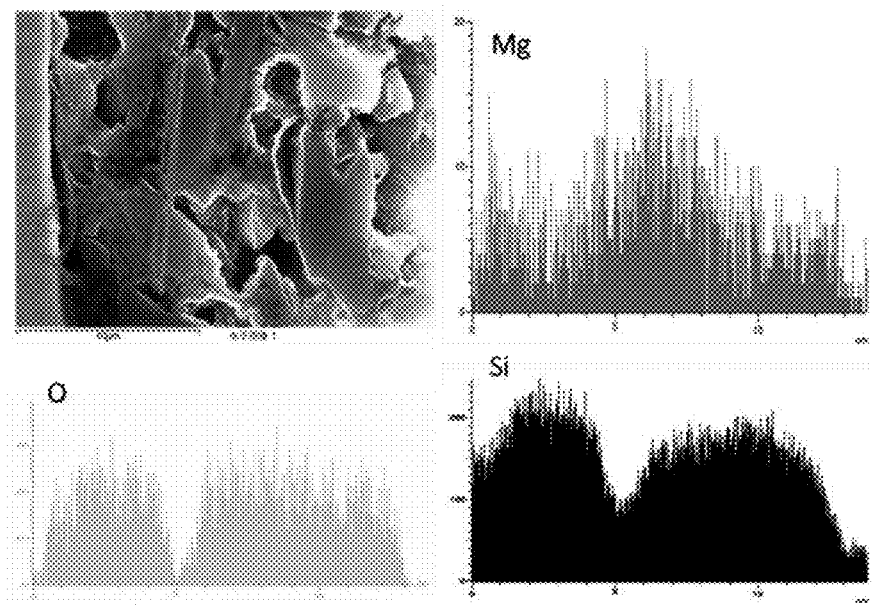
FIG. 6 shows a scanning electron microscope (SEM) image of a cross-section and an elemental distribution diagram of elements O, Mg and Si of the sample obtained in Embodiment 1 of the present application.

FIG. 6 shows a SEM image of a cross-section and a linear scanning element distribution map of the sample obtained in Embodiment 1. It can be seen from FIG. 6 that the magnesium content on the edge region of the particle is high, proving the existence of the magnesium silicate shell layer.

Figure 7:
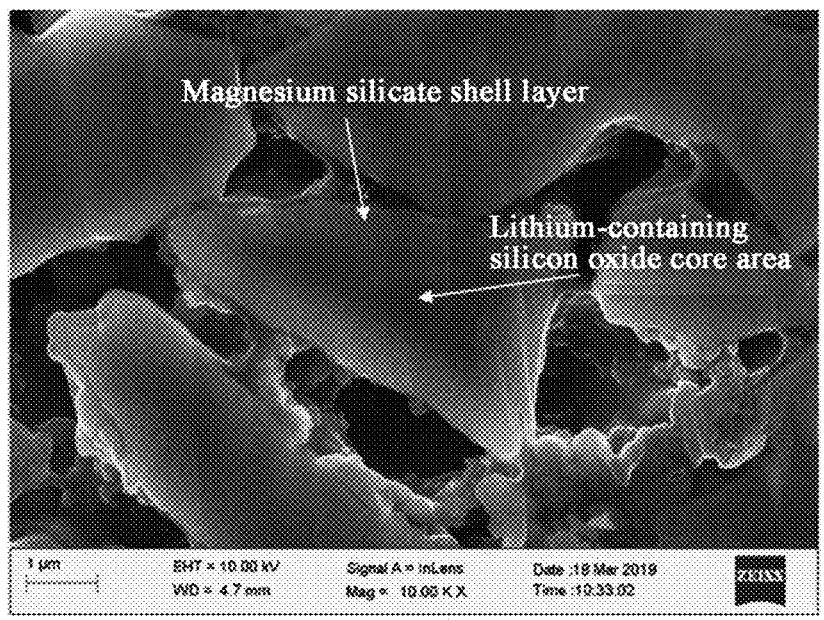
FIG. 7 is a scanning electron microscope (SEM) image of a cross-section of the sample obtained in Embodiment 1 of the present application.

FIG. 7 is a SEM image of a cross-section of the sample obtained in Embodiment 1. The existence of the magnesium silicate shell layer and the lithiated silicon oxide can be seen from FIG. 7.

Figure 8:
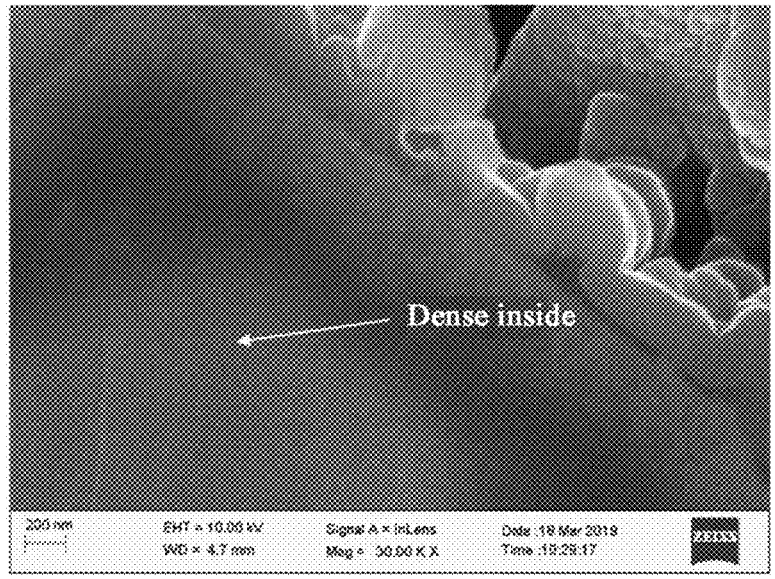
FIG. 8 is an enlarged view of a scanning electron microscope (SEM) image of a cross-section of the sample obtained in Embodiment 1 of the present application.

FIG. 8 is an enlarged view of a SEM image of a cross-section of the sample obtained in Embodiment 1. As can be seen from FIG. 8, the interior of the particles is dense and void-free.

It can be seen from the test results of Embodiment 1 and Comparative Example 1 that compared with the commercial silicon oxide $SiO_x$ without any treatment, the lithium-containing $SiO_x \cdot Mg_2SiO_4$ core-shell material had a significant increase in the first discharge coulombic efficiency and a high level of gram capacity. This was because lithium and magnesium chemically react with the inactive component $SiO_2$ in the commercial silicon oxide $SiO_x$ to form the corresponding silicate, which did not consume the reversible lithium during subsequent charging, thereby improving the first discharge coulombic efficiency of the anode material.

It can be seen from the test results of Comparative Example 1, Comparative Example 2 and Embodiment 1 that the improvement of the first discharge coulombic efficiency of the anode material $SiO_x \cdot Mg_2SiO_4$ obtained by only coating the commercial silicon oxide $SiO_x$ with magnesium silicate, but not doping with lithium was less than that of Embodiment 1. The reason was that only a limited area on the surface of the silicon oxide $SiO_x$ in the anode material $SiO_x \cdot Mg_2SiO_4$ of Comparative Example 2 was doped, while a large amount of the inactive component $SiO_2$ existed in the undoped core area of the inside, and the inactive component consumed a large amount of the irreversible lithium during the first lithium intercalation.

Figure 9:
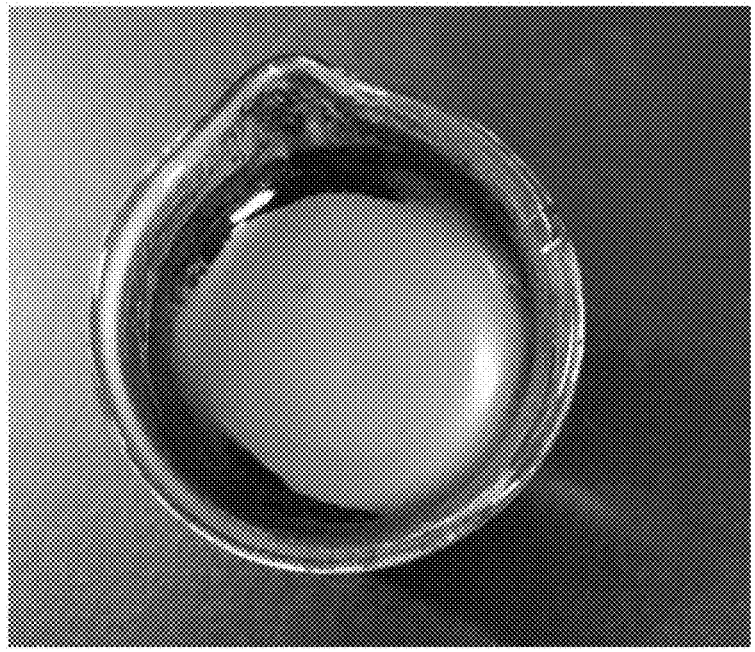
FIG. 9 shows the experimental results of the stability of the sample obtained in Embodiment 1 of the present application in water.
Figure 10:
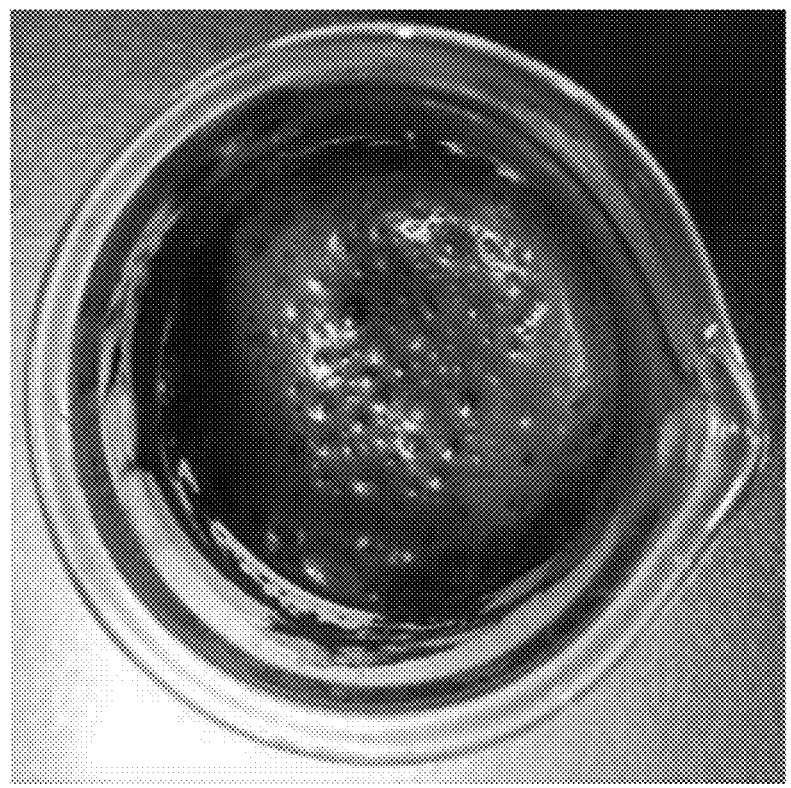
FIG. 10 shows the experimental results of the stability of the sample obtained in Comparative Example 3 of the present application in water.

It can be seen from the test results of Embodiment 1 and Comparative Example 3 that the anode material obtained by only doping the commercial silicon oxide $SiO_x$ with lithium, but not coating with magnesium silicate can have a high gram capacity. This was because the relative atomic mass of the Mg element was about 3 times higher than that of the Li element, so the mass addition of the inactive substance of the material as a whole was more obvious when the Mg element was doped, so that the gram capacity was lower than the gram capacity of the anode material when only doping with lithium. However, the surface region of the silicon oxide $SiO_x$ doped with lithium alone will form a small amount of lithium-silicon alloy, and in the absence of the protection of the magnesium silicate shell layer which is stable in water, the lithium-silicon alloy reacted with water to generate hydrogen. FIG. 9 shows the experimental results of the stability of the anode material obtained in Embodiment 1 of the present application in water. It can be seen that the anode material of Embodiment 1 of the present application did not react with water due to the protection of the magnesium silicate shell layer. On the other hand, as shown in FIG. 10, since the anode material of Comparative Example 3 has the LiSi alloy on the surface, the LiSi alloy reacted with water in the absence of the protection of the magnesium silicate shell layer, thereby generating a large amount of bubbles.

It can be seen from the test results of Embodiment 1, Embodiment 3 and Embodiment 4 that when the weight ratio of the doping lithium source to the intermediate product $SiO_x \cdot Mg_2SiO_4$ was increased, the Li content in the final product increased, the Li/Si element content ratio increased, all the products contained $Li_2SiO_3$ and $Li_2Si_2O_5$, and the first discharge coulombic efficiency of the materials gradually increased. The increase of the Li content in the products resulted in an increase in the first coulombic efficiency, because more of the inactive component $SiO_2$ was pre-lithiated in advance and the consumption of the reversible lithium by the inactive component during charging was avoided.

Figure 11:
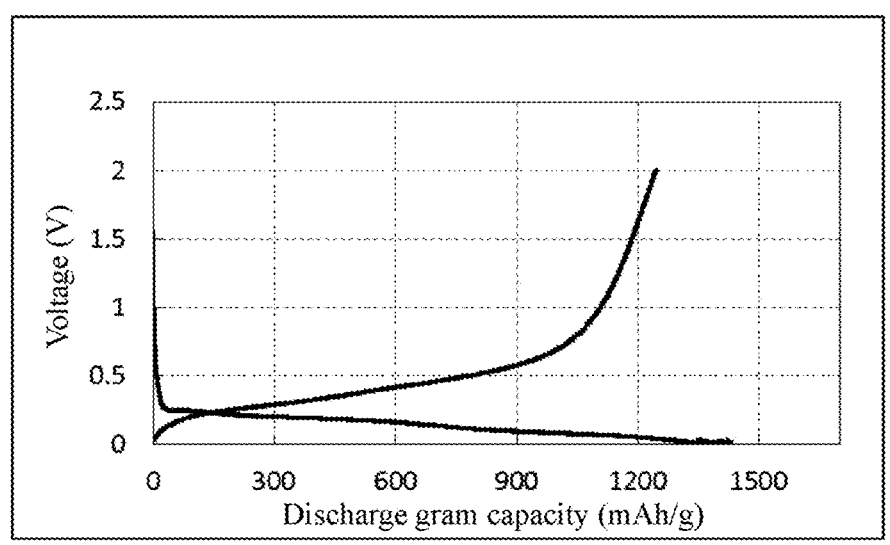
FIG. 11 is a graph showing the first charge and discharge curves of the sample obtained in Embodiment 1 of the present application.

FIG. 11 is a graph showing the first charge and discharge curves of the sample obtained in Embodiment 1. Based on the charge and discharge curves, the first charge gram capacity, the first discharge gram capacity, and the first coulombic efficiency of the sample of Embodiment 1 can be calculated.

Figure 12:
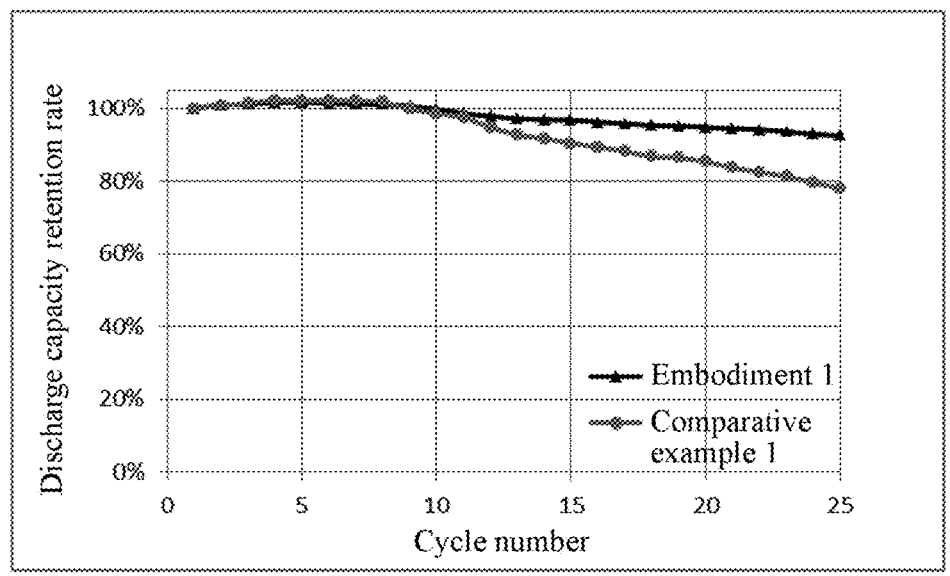
FIG. 12 shows the cycle curves of the samples obtained in Embodiment 1 and Comparative Example 1 of the present application.

FIG. 12 shows cycle curves of the samples obtained in Embodiment 1 and Comparative Example 1. As shown in FIG. 12, as compared to the anode material of Comparative Example 1, the anode material of Embodiment 1 has better cycle stability.

References throughout the specification to "some embodiments," "partial embodiments," "one embodiment," "another example," "example," "specific example" or "partial examples" mean that at least one embodiment or example of the application comprises specific features, structures, materials or characteristics described in the embodiments or examples. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An anode material, comprising: a lithiated silicon oxide material and a $M_ySiO_z$ layer,
    wherein the lithiated silicon oxide material includes $Li_2SiO_3$, $Li_2Si_2O_5$ or a combination thereof, and the $M_ySiO_z$ layer is coated on the lithiated silicon oxide material;
    M comprises B; and
    0<y<3, and 0.5<z<6;
    wherein a weight percentage of the M element is 10 wt % to 30 wt %, based on a total weight of the anode material.

2. The anode material according to claim 1, wherein the $M_ySiO_z$ layer further comprises $Mg_2SiO_4$, $Al_2SiO_5$, $Zn_2SiO_4$, $CaSiO_3$, $BaSiO_3$, or any combination thereof.

3. The anode material according to claim 1, wherein a thickness of the $M_ySiO_z$ layer is 0.2 μm to 3 μm.

4. The anode material according to claim 1, further comprising a carbon layer coating on at least a portion of the $M_ySiO_z$ layer.

5. The anode material according to claim 4, wherein a thickness of the carbon layer is 1 nm to 500 nm.

6. The anode material according to claim 1, wherein a weight percentage of the Li element is 2 wt % to 20 wt %, based on a total weight of the anode material.

7. The anode material according to claim 1, wherein a ratio of a weight percentage of the Li element to that of the Si element is 3 to 30.

8. The anode material according to claim 1, wherein a ratio of a weight percentage of the M element to that of the Si element is 5-60.

9. The anode material according to claim 1, wherein the anode material includes nanometer Si grains.

10. A method for preparing an anode material, comprising:
    (1) mixing a M source with a silicon oxide $SiO_x$ to form a mixed material;
    carrying out a high-temperature treatment on the mixed material at 800-1300° C. for 1-5 h;
    grinding the material subjected to the high-temperature treatment to obtain a grinded material; and
    (2) mixing the grinded material with a Li source;
    carrying out high-temperature treatment at 500-800° C. for 1-5 h;
    wherein 0.5<x<2; and
    M comprises B.

11. An anode comprising an anode material, wherein the anode material comprises a lithiated silicon oxide material and a $M_ySiO_z$ layer, wherein
    the lithiated silicon oxide material includes $Li_2SiO_3$, $Li_2Si_2O_5$ or a combination thereof, and the $M_ySiO_z$ layer is coated on the lithiated silicon oxide material;
    M comprises B; and 0<y<3, and 0.5<z<6;
    wherein a weight percentage of the M element is 10 wt % to 30 wt %, based on a total weight of the anode material.

12. The anode according to claim 11, wherein the $M_ySiO_z$ layer further comprises $Mg_2SiO_4$, $Al_2SiO_5$, $Zn_2SiO_4$, $CaSiO_3$, $BaSiO_3$, or any combination thereof.

13. The anode according to claim 11, wherein a thickness of the $M_ySiO_z$ layer is 0.2 μm to 3 μm.

14. The anode according to claim 11, further comprising a carbon layer coating on at least a portion of the $M_ySiO_z$ layer.

15. The anode according to claim 14, wherein a thickness of the carbon layer is 1 nm to 500 nm.

16. The anode according to claim 11, wherein a weight percentage of the Li element is 2 wt % to 20 wt %, based on a total weight of the anode material.

17. The anode according to claim 11, wherein a ratio of a weight percentage of the Li element to that of the Si element is 3 to 30.

18. The anode according to claim 11, wherein a ratio of a weight percentage of the M element to that of the Si element is 5-60.

* * * * *